(12) United States Patent
Kim et al.

(10) Patent No.: US 7,903,868 B2
(45) Date of Patent: Mar. 8, 2011

(54) VIDEO FINGERPRINTING APPARATUS IN FREQUENCY DOMAIN AND METHOD USING THE SAME

(75) Inventors: Hwan Joon Kim, Yongin-si (KR); Mi Suk Huh, Yongin-si (KR); Dae Youb Kim, Yongin-si (KR); Won Hyung Lee, Yongin-si (KR); Kil Sang Yoo, Yongin-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 995 days.

(21) Appl. No.: 11/702,585

(22) Filed: Feb. 6, 2007

(65) Prior Publication Data

US 2008/0019577 A1    Jan. 24, 2008

(30) Foreign Application Priority Data

Jul. 24, 2006   (KR) ........................ 10-2006-0069295

(51) Int. Cl.
*G06K 9/62*      (2006.01)
(52) U.S. Cl. ..................... 382/160; 382/100; 382/232
(58) Field of Classification Search ................ 382/160
See application file for complete search history.

(56) References Cited

U.S. PATENT DOCUMENTS

| 7,046,855 | B2 | 5/2006 | Sadeh |
| 7,343,025 | B2 * | 3/2008 | Seo et al. ............... 382/100 |
| 2005/0125845 | A1 | 6/2005 | Hardt et al. |
| 2005/0213826 | A1 | 9/2005 | Neogi |
| 2006/0110005 | A1 | 5/2006 | Tapson |

FOREIGN PATENT DOCUMENTS

| JP | 2000-156848 | 6/2000 |
| KR | 2001-0102075 | 11/2001 |

* cited by examiner

*Primary Examiner* — Samir A Ahmed
*Assistant Examiner* — Ruiping Li
(74) *Attorney, Agent, or Firm* — NSIP Law

(57) ABSTRACT

A video fingerprint insertion apparatus is provided. A frequency domain selection unit selects a frequency domain into which a fingerprint is inserted, from frequency domains of a video; a fingerprint insertion position determination unit determines a position where the fingerprint is to be inserted, based on a fingerprint insertion determination value in the selected frequency domain; and a fingerprint insertion unit inserts a fingerprint bit stream whose insertion strength is controlled, to the position where the fingerprint is to be inserted.

30 Claims, 9 Drawing Sheets

VIDEO FINGERPRINTING APPARATUS IN FREQUENCY DOMAIN AND METHOD USING THE SAME

CROSS-REFERENCE TO RELATED APPLICATIONS

This application claims the benefit under 35 U.S.C. §119 (a) of Korean Patent Application No. 10-2006-0069295, filed in the Korean Intellectual Property Office on Jul. 24, 2006, the entire disclosure of which is hereby incorporated by reference.

BACKGROUND OF THE INVENTION

1. Field of the Invention

The present invention relates to a video fingerprinting apparatus and method. More particularly, the present invention relates to an apparatus and method of video fingerprinting in a frequency domain, protection from recompression of a video.

2. Description of the Related Art

Multimedia data may be easily copied and transformed via a network due to the generalization of digital media and the development of various multimedia data transmission devices, storage devices, and authoring tools. Since multimedia data may be easily copied, new services are provided and pirate copies of copyrighted contents of digital media can be generated.

Fingerprinting protects the copyright of the digital media, in which a signature of an author or fingerprint for verifying the author is inserted in the digital media to be extracted to solve any problems with respect to the copyright of the digital media.

A conventional method of video fingerprinting in a space domain may quickly insert a fingerprint by using a color property before image compression. However, the conventional method additionally requires a recompression process after the inserting of the fingerprint and is vulnerable to a frame conversion attack.

In a conventional method of video fingerprinting in a compressed domain by managing a bit stream in the compressed domain, since a fingerprint is directly inserted into or extracted from an encoded discrete cosine transform (DCT) coefficient, the conventional method is very vulnerable to a recompression attack with respect to the video.

The Cox and Langelarr methods are representative examples of the conventional method of fingerprinting in a compressed domain. According to the Cox method, the fingerprint is seriously compromised when a bit rate and a frame structure are changed while recompressing a moving picture since an inserted fingerprint only affects a frequency property in the compressed domain. The shaping of the fingerprint requires an additional operation.

Though a very quick operation is possible, the Langelaar method has a structure very vulnerable to moving picture recompression.

Accordingly, there is a need for an improved system and method of video fingerprinting in a frequency domain, which is protected from video recompression.

SUMMARY OF THE INVENTION

An aspect of embodiments of the present invention is to address at least the above problems and/or disadvantages. Accordingly, an aspect of embodiments of the present invention is to provide an apparatus and method of video fingerprinting in a frequency domain, which is protected from a video recompression attack by inserting a fingerprint in a lowest frequency domain of a video converted into a video of a frequency domain.

An aspect of an embodiment of the present invention also provides a video fingerprinting apparatus and method to protect from fingerprinting attacks such as recompression, filtering, and video format conversion, by inserting a fingerprint in a lowest frequency domain of a video, based on a fingerprint insertion determination value.

An aspect of an embodiment of the present invention also provides a video fingerprinting apparatus and method capable of fingerprinting by using a small amount memory and few calculations, thereby fingerprinting in real-time.

An aspect of an embodiment of the present invention also provides a video fingerprinting apparatus and method capable of extracting a fingerprint without an original video.

According to an aspect of an embodiment of the present invention, a video fingerprint insertion apparatus is provided. The apparatus includes a frequency domain selection unit, a fingerprint insertion position determination unit and a fingerprint insertion unit. The frequency domain selection unit selects a frequency domain into which a fingerprint is inserted, from frequency domains of a video. The fingerprint insertion position determination unit determines a position in which the fingerprint is to be inserted, based on a fingerprint insertion determination value in the selected frequency domain. The fingerprint insertion unit inserts a fingerprint bit stream whose insertion strength is controlled, to the position in which the fingerprint is to be inserted.

The fingerprint insertion position determination unit may determine that the position in which the fingerprint insertion determination value is less than a predetermined threshold is the position in which the fingerprint is to be inserted.

The fingerprint insertion determination value may be acquired by Equation 1.

$$m_i = \left| w_i - \frac{w_{i-1} + w_{i+1}}{2} \right| \qquad \text{[Equation 1]}$$

in which $m_i$ indicates the fingerprint insertion determination value, $w_i$ indicates a DWT coefficient, and i is a permutation indicating a position of the DWT coefficient.

According to another aspect of an embodiment of the present invention, a video fingerprint detection apparatus is provided. The video fingerprint detection apparatus includes a frequency domain selection unit, a fingerprint extraction position determination unit, and a fingerprint extraction unit. The frequency domain selection unit selects a frequency domain into which a fingerprint is inserted, from frequency domains of a video. The fingerprint extraction position determination unit determines a position in which the fingerprint is inserted, based on a fingerprint extraction determination value in the selected frequency domain. The fingerprint extraction unit extracts a fingerprint bit stream from the position in which the fingerprint is inserted.

The fingerprint extraction position determination unit may determine that the position in which the fingerprint extraction determination value is less than a predetermined threshold is the position in which the fingerprint is inserted, and the fingerprint extraction determination value may be acquired by Equation 3.

$$m'_i = \left| y'_i - \frac{y'_{i-1} + y'_{i+1}}{2} \right|$$ [Equation 3]

in which $m'_i$ indicates a fingerprint extraction determination value, $y'_i$ indicates a DWT coefficient of the position in which the fingerprint is to be inserted, and i is a permutation indicating a position of the DWT coefficient.

According to still another aspect of an embodiment of the present invention, a video fingerprint insertion method is provided. A frequency domain is selected into which a fingerprint is inserted, from frequency domains of a video. A position in which the fingerprint is to be inserted is determined, based on a fingerprint insertion determination value in the selected frequency domain. A fingerprint bit stream whose insertion strength is controlled is inserted, to the position in which the fingerprint is to be inserted.

According to yet another aspect of an embodiment of the present invention, a video fingerprint detection method is provided. A frequency domain, into which a fingerprint is inserted, is selected from frequency domains of a video. A position at which the fingerprint is inserted, is determined based on a fingerprint extraction determination value in the selected frequency domain. A fingerprint bit stream is extracted from the position where the fingerprint is inserted.

Other aspects of the invention will become apparent to those skilled in the art from the following detailed description, which, taken in conjunction with the annexed drawings, discloses embodiments of the invention.

The above and other aspects of embodiments of the present invention will be more apparent from the following description, taken in conjunction with the accompanying drawings, in which:

BRIEF DESCRIPTION OF THE DRAWINGS

Throughout the drawings, the same reference numerals will be understood to refer to the same elements, features and structures.

DETAILED DESCRIPTION OF EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

Figure 1:
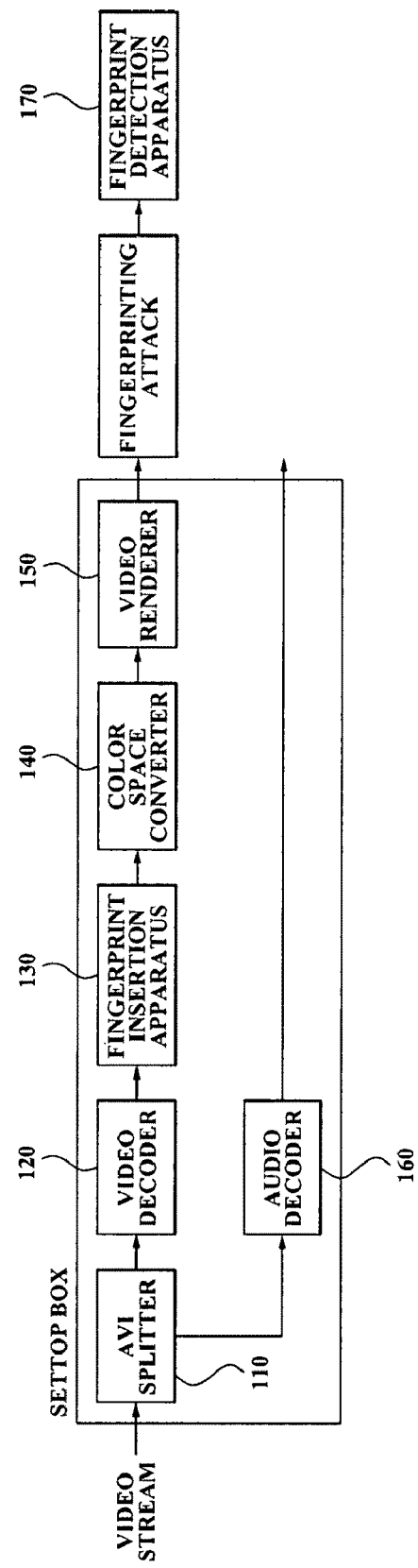
FIG. 1 is a block diagram illustrating a configuration of a video fingerprint system according to an embodiment of the present invention.

FIG. 1 is a block diagram illustrating a configuration of a video fingerprint system according to an embodiment of the present invention. Referring to FIG. 1, the system includes a set top box (STB) including a fingerprint insertion apparatus 130, and a fingerprint detection apparatus 170.

The STB includes an audio video interleaving (AVI) splitter 110, a video decoder 120, a fingerprint insertion apparatus 130, a color space converter 140, a video renderer 150, and an audio decoder 160. The AVI splitter 110 splits a video and an audio from an input video stream. The audio decoder 160 decodes the audio. The video decoder 120 decodes and outputs the video acquired by the AVI splitter 110.

The fingerprint insertion apparatus 130, according to an embodiment of the present invention, converts the decoded video into a video of a frequency domain. According to an implementation the fingerprint insertion apparatus 130 inserts a fingerprint into a lowest frequency domain and converts the video in which the fingerprint is inserted in the frequency domain, into a video of a space domain to output.

The color space converter 140 converts the decoded video of the space domain into a format such as RGB or YUV.

The video renderer 150 outputs the format-converted video in the form of a digital video/visual interactive (DVI) or a component to display on a screen.

The fingerprint detection apparatus 170 receives a video illegally copied using a fingerprinting attack, such as recompression, filtering, and video format conversion, and detects a fingerprint inserted in a lowest frequency domain of the video.

Figure 2:
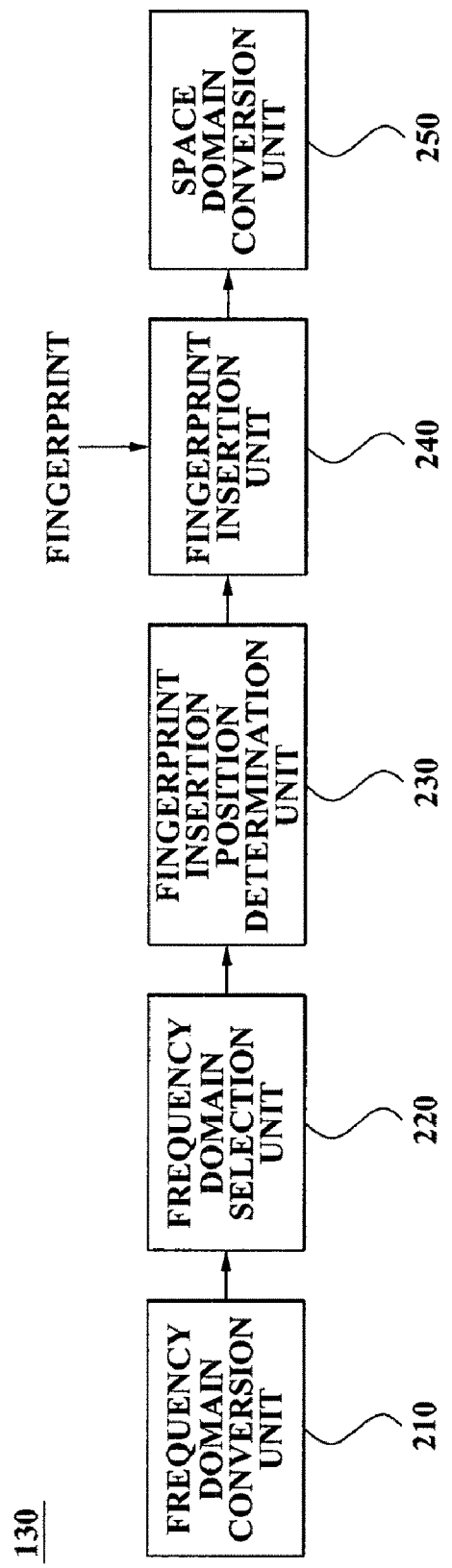
FIG. 2 is a block diagram illustrating a configuration of a video fingerprint insertion apparatus illustrated in FIG. 1.

FIG. 2 is a block diagram illustrating a configuration of the video fingerprint insertion apparatus 130 illustrated in FIG. 1. Referring to FIG. 2, the video fingerprint insertion apparatus 130 includes a frequency domain conversion unit 210, a frequency domain selection unit 220, a fingerprint insertion position determination unit 230, a fingerprint insertion unit 240, and a space domain conversion unit 250.

The frequency domain conversion unit 210 converts a decoded video into a video of a frequency domain. A video of a space domain is converted into a video of a frequency domain by discrete wavelet transformation (DWT).

Figure 3:
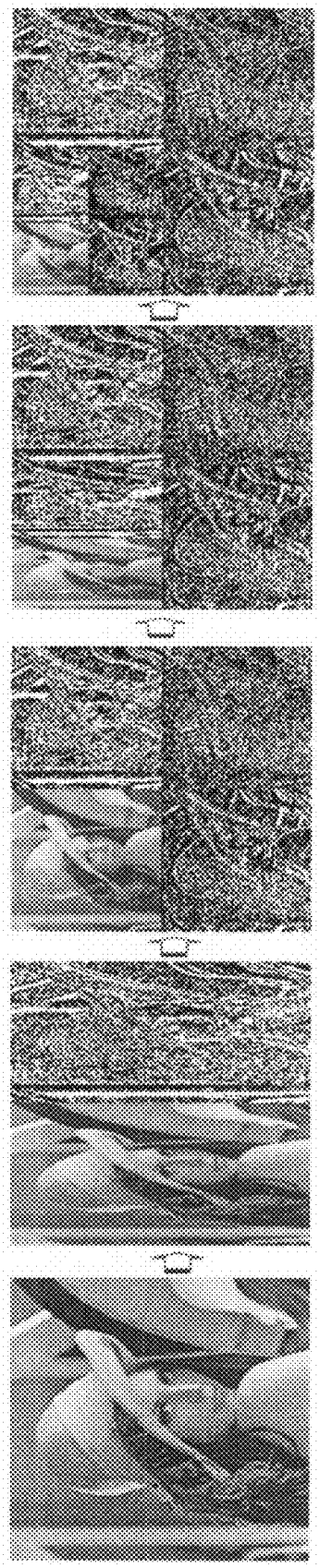
FIG. 3 is a diagram illustrating an example of a video of a space domain converted into a video of a frequency domain by two DWTs according to an embodiment of the present invention.

FIG. 3 is a diagram illustrating an example of a video of a space domain converted into a video of a frequency domain by two DWTs, according to an embodiment of the present invention. Referring to FIG. 3, in this non-limiting example, the video of the space domain is converted into the video which is segmented into seven frequency domains by two DWTs.

According to an implementation, each of the frequency domains of the divided video is different from the others, and a frequency domain into which a fingerprint will be inserted is selected from a plurality of the frequency domains by the frequency domain selection unit 220.

Namely, the frequency domain selection unit 220 selects the frequency domain into which the fingerprint is inserted, from the plurality of frequency domains formed by DWT processing. A lowest frequency domain may be selected.

When inserting the fingerprint in the lowest frequency domain, since a required amount of calculations in insertion and detection of the fingerprint and a required amount of memory storage are relatively small, the insertion and the detection of the fingerprint may be processed in real time.

Figure 4:
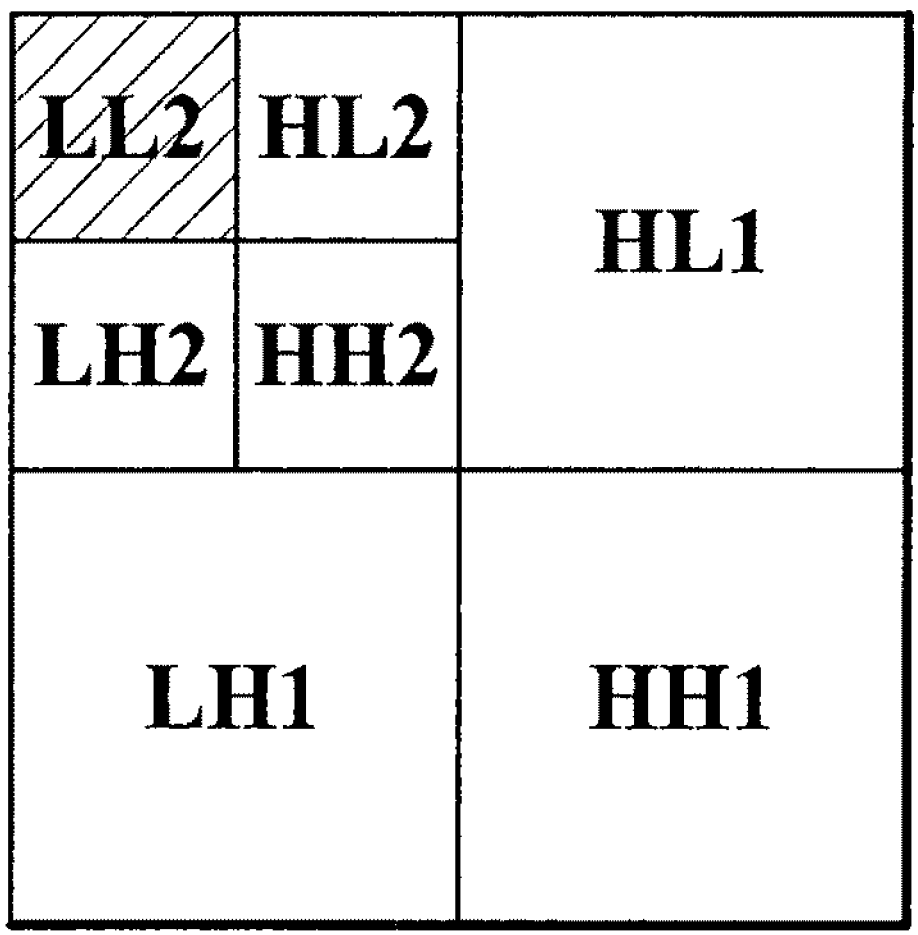
FIG. 4 is a diagram illustrating frequency domains of a video converted into a video of a frequency domain according to an embodiment of the present invention.

FIG. 4 is a diagram illustrating an example of a plurality of frequency domains formed by the two DWTs in the above example. Seven frequency domains include a highest frequency domain HH1, five mid-frequency domains HL2, LH2, HH2, HL1, and LH1, and a lowest frequency domain LL2. Accordingly, the frequency domain selection unit 220 selects the lowest frequency domain LL2, illustrated in FIG. 4, as the frequency domain into which the fingerprint will be inserted.

The fingerprint insertion position determination unit 230 determines a position into which the fingerprint will be inserted, from the selected lowest frequency domain. According to an implementation, a position whose fingerprint insertion determination value is less than a predetermined threshold may be determined to be the position into which the fingerprint will be inserted. According to an implementation, the threshold may be acquired by $2^k \times 10$, and k indicates a level of the DWT.

The fingerprint insertion determination value determining a fingerprint insertion position may be acquired by Equation 1.

$$m_i = \left| w_i - \frac{w_{i-1} + w_{i+1}}{2} \right| \qquad \text{[Equation 1]}$$

According to an implementation, $m_i$ indicates a fingerprint insertion determination value, $w_i$ indicates a DWT coefficient, and i is a permutation indicating a position of the DWT coefficient.

Referring to Equation 1, the fingerprint insertion determination value is an average value of a sequential block of a DWT coefficient in the lowest frequency domain. Namely, in consideration of image degradation of a video, when a difference between a DWT coefficient of a corresponding pixel and an average of DWT coefficients of two neighboring pixels is greater than a threshold, a fingerprint bit stream is not inserted. When the difference is not greater than the threshold, the fingerprint is inserted.

The fingerprint insertion unit 240 inserts the fingerprint bit stream in a DWT coefficient position determined using Equation 1 by the fingerprint insertion position determination unit 230. According to an implementation, the fingerprint bit stream is inserted while insertion strength is controlled.

The DWT coefficient into which the fingerprint bit stream is inserted is calculated as shown in Equation 2.

$$w_i' = \frac{(w_{i-1} + w_{i+1})}{2} \cdot (1 + \alpha \cdot x_i) \qquad \text{[Equation 2]}$$

in which $w_i'$ indicates a DWT coefficient of the position where the fingerprint is to be inserted, $w_i$ indicates a DWT coefficient, $\alpha$ indicates an insertion strength control coefficient, $x_i$ indicates a fingerprint bit stream, and i is a permutation indicating a position of the DWT coefficient.

According to an implementation, the insertion strength control coefficient may be controlled by considering protection from an attack and imperceptibility of a resultant fingerprinted video image, and has a value from 0.02 to 0.1.

According to an implementation, the fingerprint bit stream may be 1 or −1.

The space domain conversion unit 250 converts the video in the frequency domain in which the fingerprint is inserted into the lowest frequency domain, into a video of a space domain. According to an implementation, conversion into the space domain may be performed by an inverse DWT.

The video fingerprint insertion apparatus, according to an embodiment of the present invention, includes a unit for converting a video into a video of a frequency domain by a DWT, a unit for selecting a lowest frequency domain into which a fingerprint will be inserted, a unit for determining a position into which a fingerprint bit stream will be inserted in the lowest frequency domain, a unit for inserting the fingerprint bit stream into the determined position, and a unit for converting the video in the frequency domain into a video in a space domain by an inverse DWT. Therefore, the video fingerprint insertion apparatus may be protected from fingerprinting attacks such as video recompression, filtering, and video format conversion.

Figure 5:
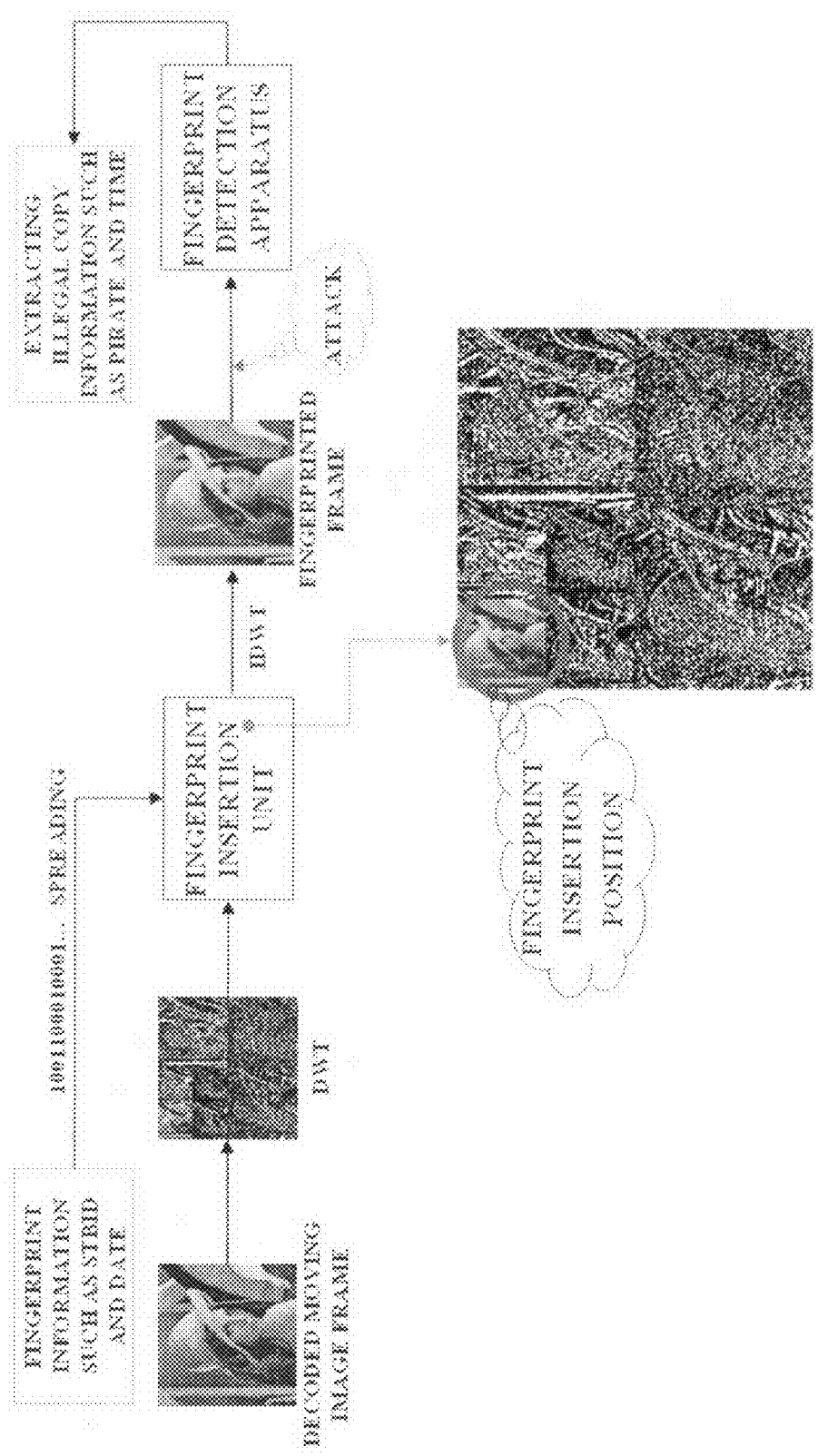
FIG. 5 is a diagram illustrating a process of inserting a fingerprint, according to an embodiment of the present invention.

FIG. 5 is a diagram illustrating a process of inserting a fingerprint, according to an embodiment of the present invention. Referring to FIG. 5, when a decoded moving image frame such as a video decoded by the video decoder 120 illustrated in FIG. 2, is input, the decoded video is converted into a video in a frequency domain by two DWTs and a fingerprint is inserted into a lowest frequency domain selected from the frequency domains of the converted video. According to an implementation, a DWT coefficient into which the fingerprint bit stream will be inserted is determined from the lowest frequency domain, and a fingerprint bit stream that is information such as an STB identification (STBID) and a date is inserted into the DWT coefficient.

The video in which the fingerprint is inserted into the lowest frequency domain is converted into a video in a space domain by two inverse DWTs.

When the video in the space domain, in which the fingerprint is inserted, has fingerprinting attacked by illegal copying, information from the illegal copy may be verified by detecting the fingerprint in the illegally copied video, such as an STBID and a copy time, by the video fingerprint detection apparatus 170 according to an embodiment of the present invention.

Figure 6:
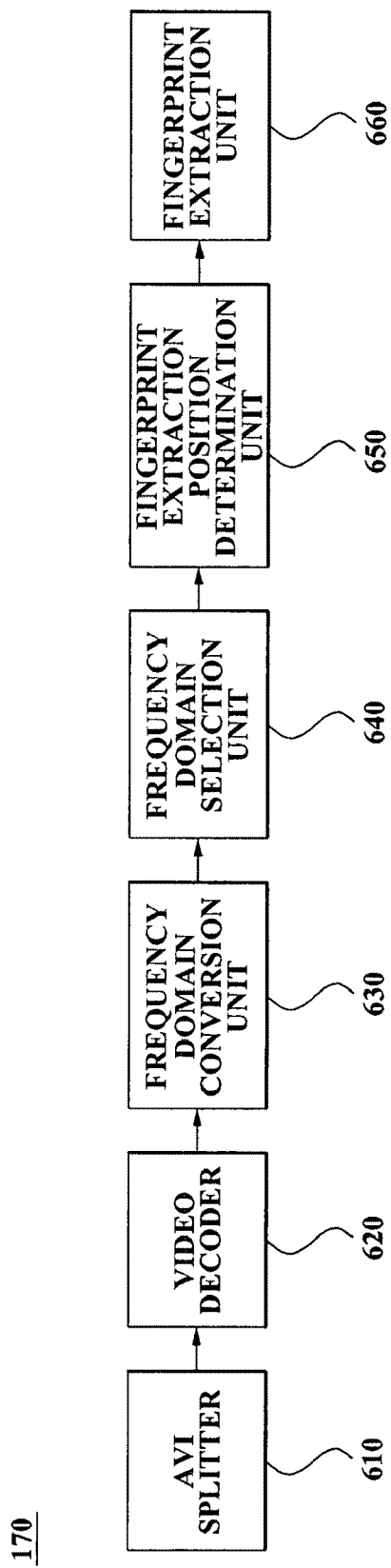
FIG. 6 is a block diagram illustrating a configuration of a video fingerprint detection apparatus shown in FIG. 1.

FIG. 6 is a block diagram illustrating a configuration of the video fingerprint detection apparatus 170 shown in FIG. 1. Referring to FIG. 6, the video fingerprint detection apparatus 170 includes an AVI splitter 610, a video decoder 620, a frequency domain conversion unit 630, a frequency domain selection unit 640, a fingerprint extraction position determination unit 650, and a fingerprint extraction unit 660.

The AVI splitter 610, the video decoder 620, the frequency domain conversion unit 630, and the frequency domain selection unit 640 perform the same function as the AVI splitter 110, the video decoder 120, the frequency domain conversion unit 210, and the frequency domain selection unit 220, illustrated in FIGS. 1 and 2.

Specifically, the AVI splitter 610 splits a video and an audio from an input video stream such as, for example, an illegally copied video. The video decoder 620 decodes the video split by the AVI splitter 610 and outputs a decoded video.

The frequency domain conversion unit 630 converts the decoded video into a video in a frequency domain by DWT. According to an implementation, the decoded video may be converted into the video in the frequency domain by two DWTs.

The frequency domain selection unit 640 selects a frequency domain into which a fingerprint is inserted, from frequency domains of the illegally copied video. According to an implementation, a lowest frequency domain may be selected.

The fingerprint extraction position determination unit 650 determines a DWT coefficient position into which the fingerprint is inserted, based on a fingerprint extraction determination value, from the lowest frequency domain selected by the frequency domain selection unit 640. The fingerprint extraction determination value is compared with a predetermined threshold and a corresponding position is determined to be the DWT coefficient into which a fingerprint bit stream is inserted, when the fingerprint extraction determination value is less than the threshold. According to an implementation, the threshold compared with the fingerprint extraction determination value may be identical to or different from the threshold compared with the fingerprint insertion determination value when the fingerprint insertion apparatus 130 determines the fingerprint insertion position.

The fingerprint extraction determination value used for determining the DWT coefficient position into which the fingerprint is inserted is acquired as shown in Equation 3.

$$m'_i = \left| y'_i - \frac{y'_{i-1} + y'_{i+1}}{2} \right|$$ [Equation 3]

in which $m_i'$ indicates a fingerprint extraction determination value, $y_i'$ indicates a DWT coefficient of the position where the fingerprint is to be inserted, and i is a permutation indicating a position of the DWT coefficient.

When the fingerprint extraction position determination unit 650 determines the DWT coefficient position into which the fingerprint bit stream is inserted by using Equation 3, the fingerprint extraction unit 660 extracts the fingerprint bit stream from the determined DWT coefficient position.

According to an implementation, the fingerprint bit stream inserted into the DWT coefficient position may be extracted as shown in Equation 4.

$$x'_i = \left[ \frac{2y'_i - (y'_{i-1} + y'_{i+1})}{\alpha \cdot (y'_{i-1} + y'_{i+1})} \right]$$ [Equation 4]

in which $x_i'$ indicates a fingerprint bit stream, $y_i'$ indicates a DWT coefficient of the position where the fingerprint is to be inserted, α indicates an insertion strength control coefficient determined when inserting the fingerprint, and i is a permutation indicating a position of the DWT coefficient.

According to an implementation, the insertion strength control coefficient α is determined when the fingerprint insertion apparatus 130 inserts the fingerprint, and may be a value from 0.02 to 0.1. According to an exemplary implementation, the fingerprint bit stream extracted by Equation 4 may be 1 or −1. When the fingerprint extraction determination value is greater than the threshold, namely, when it is determined that the fingerprint bit stream is not inserted into the DWT coefficient, the fingerprint bit stream may be 0. To distinguish the DWT coefficient where the fingerprint bit stream of 1 or −1 is inserted from the DWT coefficient where the fingerprint bit stream is not inserted, an extraction value of the DWT coefficient where the fingerprint bit stream is not inserted may be 0.

According to an implementation, the fingerprint detection apparatus 170 extracts the inserted fingerprint from an illegally copied video, by using Equations 3 and 4, thereby acquiring information from a pirated copy.

Also, the fingerprint detection apparatus 170 may extract a fingerprint without an original video. Embodiments of the present invention may be used in various fields such as prevention of illegal copying and distributing of moving pictures.

Figure 7:
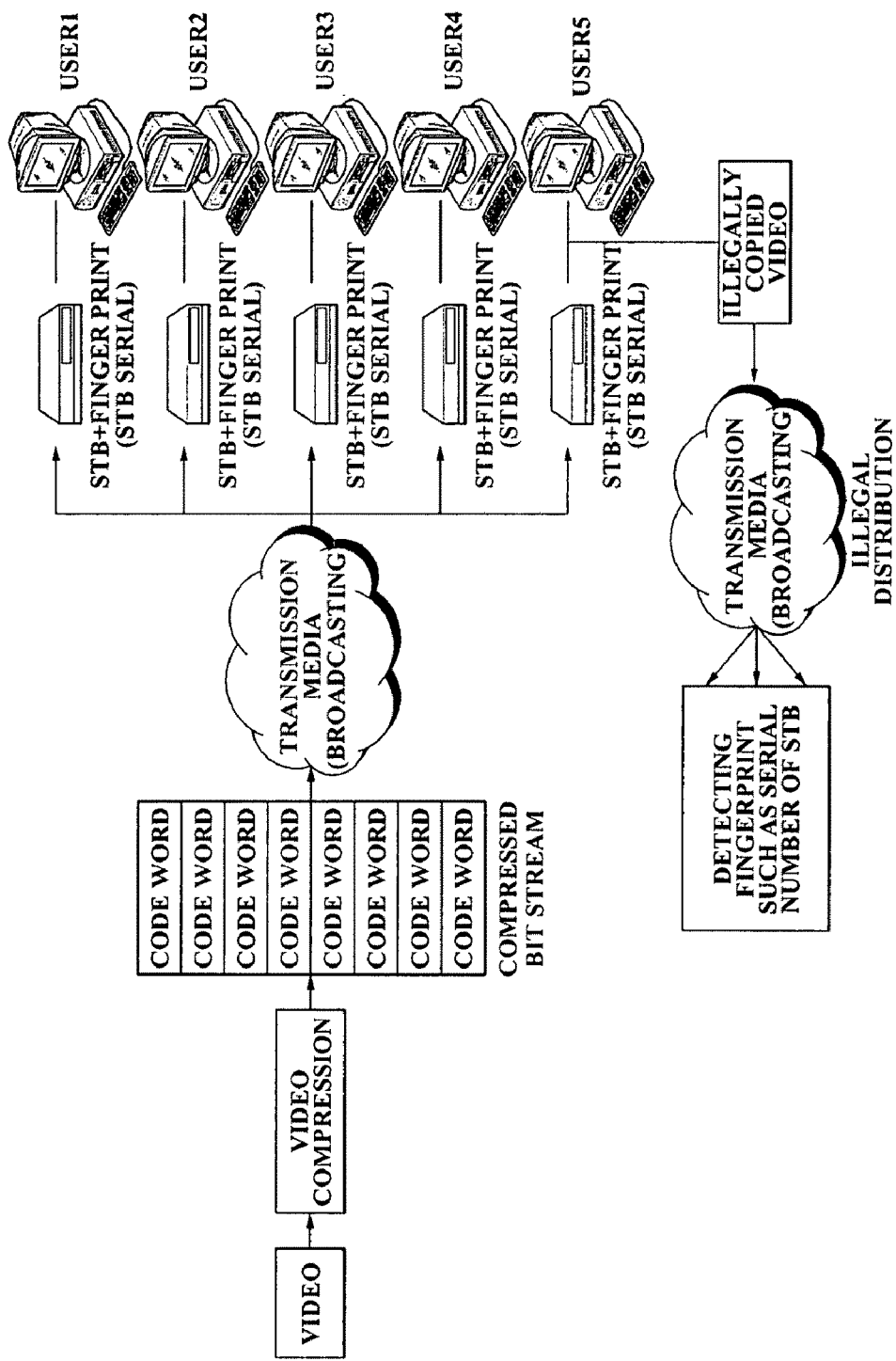
FIG. 7 is a diagram illustrating the prevention of illegal moving picture copy and distribution from available application fields according to an embodiment of the present invention.

FIG. 7 is a diagram illustrating an illegal moving picture copy and distribution prevention system from available application fields of this invention. Referring to FIG. 7, a process of tracking an illegally copied video will be described.

After an original video is compressed, a compressed bit stream may be broadcasted via a transmission media. According to an implementation, the video may be compressed by any video compression techniques such as MPEG-1, MPEG-2, and MPEG-4, among others.

The broadcasted bit stream is transmitted to user1 through user5 via each STB. According to an implementation, the STB inserts a serial number of the STB into a lowest frequency domain of the video converted into a video of a frequency domain, as a fingerprint. According to an implementation, the serial number of the STB is inserted by a fingerprint insertion apparatus 130 included in the STB.

When a video illegally copied by the user5 is illegally distributed via a transmission media after a serial number of the corresponding STB is inserted into the lowest frequency domain of the video and the video is converted into a space domain, user5 may be verified as a pirate who illegally copied the video provided by a content provider, by detecting the serial number of the STB, as the fingerprint, from the lowest frequency domain.

Figure 8:
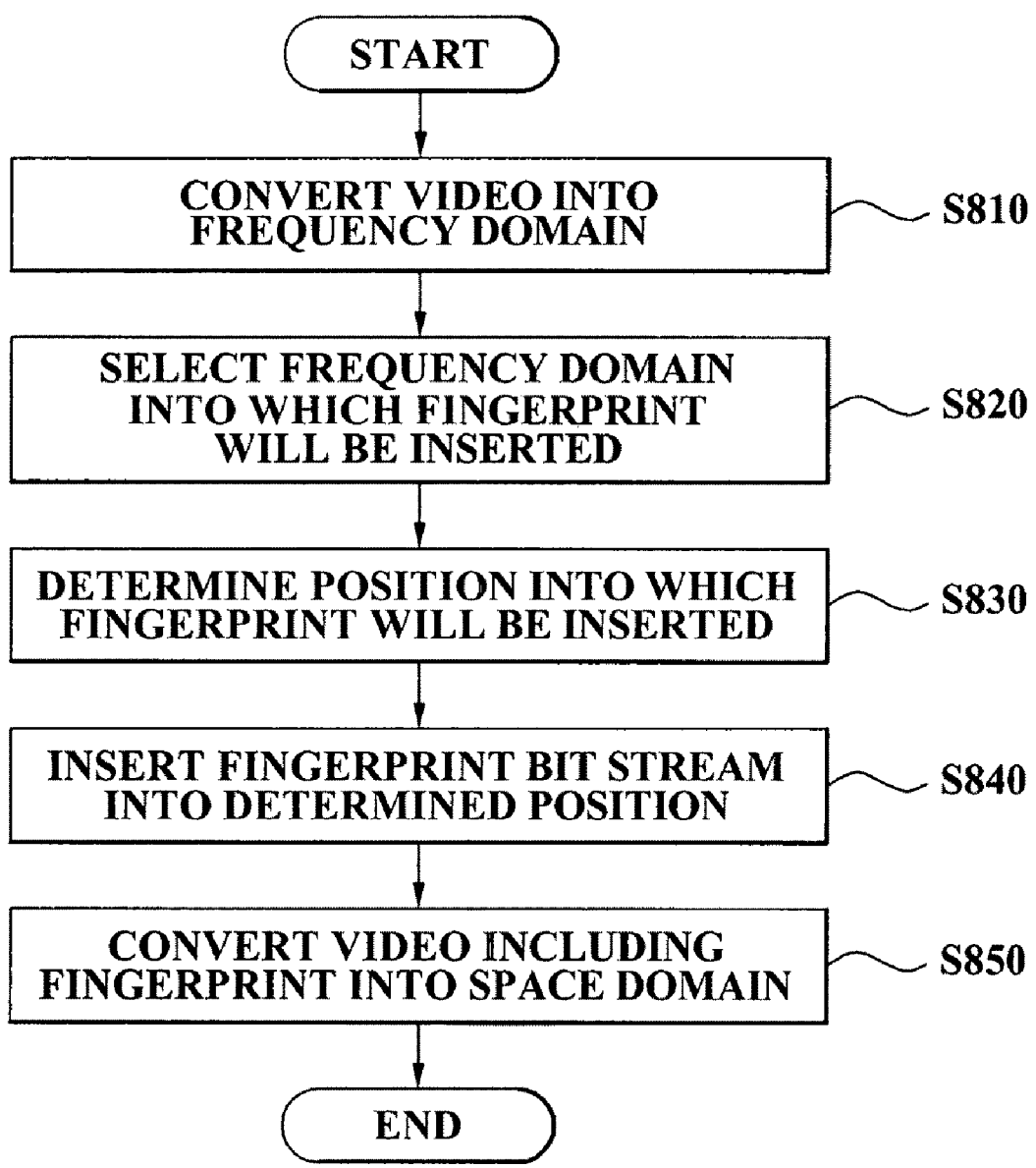
FIG. 8 is a flowchart illustrating a video fingerprint insertion method according to an embodiment of the present invention.

FIG. 8 is a flowchart illustrating a video fingerprint insertion method according to an embodiment of the present invention. Referring to FIG. 8, a video is converted into a video of a frequency domain in step S810, a fingerprint is inserted into a selected frequency domain in steps S820 through S840, and the video including the fingerprint is converted into a space domain in step S850.

Specifically, to insert a fingerprint into a decoded video, the video is converted into a video in the frequency domain in step S810. According to an implementation, the decoded video may be converted into the video in the frequency domain by two DWTs.

From the frequency domains of the video converted by the DWT, a frequency domain into which the fingerprint will be inserted is selected in step S820. According to an implementation, although the fingerprint can be inserted into any one of the frequency domains of the converted video, the fingerprint may be inserted into a lowest frequency domain. When the fingerprint is inserted into the lowest frequency domain, since few calculations and a small amount of memory storage is required for inserting and detecting the fingerprint, the insertion and the detection of the fingerprint may be processed in real time.

When the frequency domain into which the fingerprint will be inserted is selected, an insertion position of a fingerprint bit stream is determined by comparing a fingerprint insertion determination value with a predetermined threshold in step S830. When a fingerprint insertion determination value $m_i$ of a pixel, shown in Equation 1, is less than the threshold, the pixel is determined to be the position into which the fingerprint bit stream will be inserted in step S830.

When a process of determining the insertion position of the fingerprint bit stream is completed, the fingerprint bit stream is inserted into the determined position in step S840. For example, fingerprint information such as a serial number of an STB and a date is inserted. According to an implementation, the inserted fingerprint bit stream is inserted while insertion strength is controlled by an insertion strength control coefficient, and a DWT coefficient into which the fingerprint bit stream is acquired as shown in Equation 2. According to an implementation, the insertion strength control coefficient may have a value from 0.02 to 0.1.

When the fingerprint is inserted, the video of the frequency domain, including the fingerprint, is converted into a video of a space domain in step S850. According to an implementation, the conversion from the frequency domain into the space domain may be performed by two inverse DWTs.

The above series of processes facilitates a fingerprint's ability to be inserted into a lowest frequency domain of a video, according to an embodiment of the present invention. Since the fingerprint is inserted into the lowest frequency domain of the video, the video may be protected from a fingerprinting attack.

Figure 9:
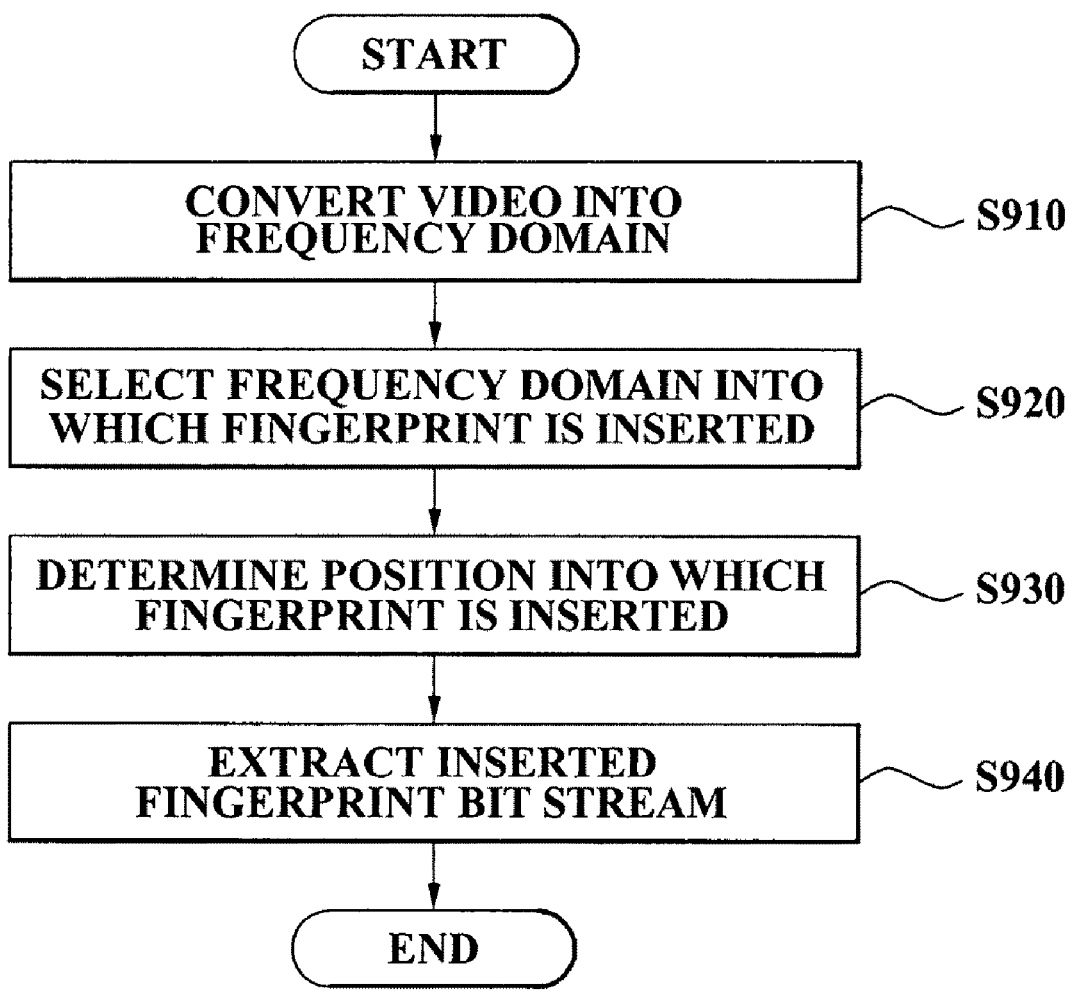
FIG. 9 is a flowchart illustrating a video fingerprint detection method according to another embodiment of the present invention.

FIG. 9 is a flowchart illustrating a video fingerprint detection method according to another embodiment of the present invention. Referring to FIG. 9, a video is converted into a video of a frequency domain in step S910, a frequency domain in which a fingerprint is inserted is selected in step S920, a position into which the fingerprint is inserted in step S930, and an inserted fingerprint bit stream is extracted in step S940.

Specifically, to insert a fingerprint into a decoded video, the video is converted into a video of frequency domain in step S910. According to an implementation, the decoded video may be converted into the video of the frequency domain by two DWTs. According to an exemplary implementation, the decoded video may be a video including a fingerprint, illegally copying using a fingerprinting attack such as recompression, filtering, and video format conversion.

A frequency domain into which a fingerprint is inserted is selected in step S920 from frequency domains of the video converted into the video of the frequency domain. Since a fingerprint insertion position is previously determined during manufacturing before distribution of video contents, the fingerprint insertion position may be predetermined when detecting the fingerprint from the illegally copied video with respect to selecting the frequency domain. The fingerprint insertion position may be a lowest frequency domain from the frequency domains of the video.

A position of a pixel or a DWT coefficient, into which a fingerprint bit stream is inserted, is determined from the frequency domain into which the fingerprint is inserted in step S930. According to an implementation, the DWT coefficient position into which the fingerprint is inserted is determined based on an acquired fingerprint extraction determination value illustrated in Equation 3. When the fingerprint extraction determination value is less than a predetermined threshold, it is determined that the fingerprint bit stream is inserted. According to an implementation, the threshold compared with the fingerprint extraction determination value may be identical to or different from the threshold compared with the fingerprint insertion determination value of the fingerprint insertion method.

When a process of determining a fingerprint bit stream insertion position is completed, the fingerprint bit stream is extracted by using the DWT coefficient into which the fingerprint bit stream is inserted, as shown in Equation 4, in step S940. According to an implementation, $\alpha$ is an insertion strength control coefficient illustrated in Equation 4. $\alpha$ is determined when inserting the fingerprint and may be a value from 0.02 to 0.1.

According to an implementation, the fingerprint bit stream extracted as shown in Equation 4 may be 1 or −1.

When all of the fingerprint bit streams are extracted, information about a user that illegally copied a video may be acquired by using information of the extracted fingerprint, such as a serial number of an STB and a date.

The video fingerprinting method according to an embodiment of the present invention may be embodied as a program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of an embodiment of the present invention, or they may be of the type that is well-known and available to those skilled in the art of computer software arts. Examples of the computer-readable media include magnetic media (for example, hard disks, floppy disks, and magnetic tapes), optical media (for example, CD-ROMs or DVD), magneto-optical media (for example, optical disks), and hardware devices (for example, ROMs, RAMs, or flash memories, among others) that are specially configured to store and perform program instructions. Examples of the program instructions include both machine code, such as produced by a compiler, and files containing high-level language codes that may be executed by the computer using an interpreter. The hardware elements above may be configured to act as one or more software modules for implementing the operations of this invention.

An aspect of an embodiment of the present invention provides a video fingerprinting apparatus and method to protect from fingerprinting attacks such as recompression, filtering, and video format conversion, by inserting a fingerprint in a lowest frequency domain of a video converted into a video of a frequency domain.

An aspect of an embodiment of the present invention also provides a video fingerprinting apparatus and method capable of being performed with only a few calculations and a small amount of memory storage when performing fingerprint insertion and detection by inserting a fingerprint into a lowest frequency domain, thereby performing fingerprinting in real time.

An aspect of an embodiment of the present invention also provides a video fingerprinting apparatus and method capable of controlling a level of protection and a level of imperceptibility by controlling strength of inserting a fingerprint bit stream.

An aspect of an embodiment of the present invention also provides a video fingerprinting apparatus and method capable of preventing distribution of illegal copied videos by using STBs including a fingerprint insertion function.

An aspect of an embodiment of the present invention also provides a video fingerprinting apparatus and method capable of being applied to any video compression techniques such as MPEG-1, MPEG-2, and MPEG-4, since an embodiment of the present invention is applied to a decoded video.

An aspect of an embodiment of the present invention also provides a video fingerprinting apparatus and method capable of extracting a fingerprint without an original video.

While the present invention has been shown and described with reference to embodiments thereof, it will be understood by those skilled in the art that various changes in form and details may be made therein without departing from the spirit and scope of the invention as defined by the appended claims and their equivalents.

What is claimed is:

1. A video fingerprint insertion apparatus, comprising:
   at least one processor, the at least one processor being configured to:

select a lowest frequency domain into which a fingerprint is to be inserted from frequency domains of a video transformed by a discrete wavelet transformation (DWT);

determine a position in which the fingerprint is to be inserted based on a fingerprint insertion determination value in the selected lowest frequency domain, the fingerprint insertion determination value being an average value of a sequential block of a DWT coefficient in the lowest frequency domain; and insert a fingerprint bit stream whose insertion strength is controlled to the position in which the fingerprint is to be inserted; and a memory coupled to the at least one processor.

2. The apparatus of claim 1, wherein the at least one processor is configured to determine that a position in which a difference between the DWT coefficient of a corresponding pixel and an average of DWT coefficients of two neighboring pixels is less than a threshold in the position is the position in which the fingerprint is to be inserted.

3. The apparatus of claim 1, wherein the fingerprint insertion determination value is acquired by $$m_i = \left| w_i - \frac{w_{i-1} + w_{i+1}}{2} \right|,$$

where $m_i$ indicates the fingerprint insertion determination value, $w_i$ indicates the DWT coefficient, and i comprises a permutation indicating a position of the DWT coefficient.

4. The apparatus of claim 3, wherein a DWT coefficient of the position in which the fingerprint is to be inserted is acquired by $$w'_i = \frac{(w_{i-1} + w_{i+1})}{2} \cdot (1 + \alpha \cdot x_i),$$

where $w'_i$ indicates the DWT coefficient of the position in which the fingerprint is to be inserted, α indicates an insertion strength control coefficient, and $x_i$ indicates a fingerprint bit stream.

5. The apparatus of claim 2, wherein the at least one processor is configured to convert and output a decoded video into a video in the lowest frequency domain by using the DWT.

6. The apparatus of claim 5, wherein the at least one processor is configured to convert the video in the frequency domain, into which the fingerprint is inserted, into a video of a space domain by using an inverse DWT.

7. A video fingerprint detection apparatus, comprising:
at least one processor, the at least one processor being configured to:
select a lowest frequency domain into which a fingerprint is inserted from frequency domains of a video transformed by a discrete wavelet transformation (DWT);
determine a position in which the fingerprint is inserted based on a fingerprint extraction determination value in the selected lowest frequency domain, the fingerprint extraction determination value being an average value of a sequential block of a DWT coefficient in the lowest frequency domain; and
extract a fingerprint bit stream from the position in which the fingerprint is inserted; and
a memory coupled to the at least one processor.

8. The apparatus of claim 7, wherein the at least one processor is configured to determine that a position in which a difference between a DWT coefficient of a corresponding pixel and an average of DWT coefficients of two neighboring pixels is less than a threshold is the position in which the fingerprint is inserted.

9. The apparatus of claim 8, wherein the fingerprint extraction determination value is acquired by $$m'_i = \left| y'_i - \frac{y'_{i-1} + y'_{i+1}}{2} \right|,$$

where m hd i' indicates the fingerprint extraction determination value, $y'_i$ indicates a DWT coefficient of the position in which the fingerprint is inserted, and i comprises a permutation indicating a position of the DWT coefficient.

10. The apparatus of claim 9, wherein the at least one processor is configured to extract the fingerprint bit stream by $$x'_i = \left[ \frac{2y'_i - (y'_{i-1} + y'_{i+1})}{\alpha \cdot (y'_{i-1} + y'_{i+1})} \right],$$

where $x_i'$ indicates the fingerprint bit stream and α indicates an insertion strength control coefficient determined when inserting the fingerprint.

11. The apparatus of claim 8, wherein the at least one processor is configured to convert and output a decoded video into a video in the lowest frequency domain by using the DWT.

12. A video fingerprint insertion method, comprising:
selecting a lowest frequency domain into which a fingerprint is inserted from frequency domains of a video transformed by a discrete wavelet transformation (DWT);
determining a position in which the fingerprint is to be inserted based on a fingerprint insertion determination value in the selected lowest frequency domain, the fingerprint insertion determination value being an average value of a sequential block of a DWT coefficient in the lowest frequency domain; and
inserting a fingerprint bit stream whose insertion strength is controlled to the position in which the fingerprint is to be inserted.

13. The method of claim 12, wherein, in the determining of the position, a position in which a difference between a DWT coefficient of a corresponding pixel and an average of DWT coefficients of two neighboring pixels is less than a threshold is determined as the position in which the fingerprint is to be inserted.

14. The method of claim 12, wherein the fingerprint insertion determination value is acquired by $$m_i = \left| w_i - \frac{w_{i-1} + w_{i+1}}{2} \right|,$$

where $m_i$ indicates the fingerprint insertion determination value, $w_i$ indicates the DWT coefficient, and i comprises a permutation indicating a position of the DWT coefficient.

15. The method of claim 14, wherein a DWT coefficient of the position in which the fingerprint is to be inserted is acquired by $$w'_i = \frac{(w_{i-1} + w_{i+1})}{2} \cdot (1 + \alpha \cdot x_i),$$

where $w_i'$ indicates the DWT coefficient of the position in which the fingerprint is to be inserted, α indicates an insertion strength control coefficient, and $x_i$ indicates a fingerprint bit stream.

16. The method of claim 15, wherein the insertion strength control coefficient comprises a value between 0.02 to 0.1.

17. The method of claim 13, further comprising converting the video in the lowest frequency domain into a video of a space domain by using inverse DWT.

18. A video fingerprint detection method, comprising:
   selecting a lowest frequency domain into which a fingerprint is inserted from frequency domains of a video transformed by a discrete wavelet transformation (DWT);
   determining a position in which the fingerprint is inserted based on a fingerprint extraction determination value in the selected lowest frequency domain, the fingerprint extraction determination value being an average value of a sequential block of a DWT coefficient in the lowest frequency domain; and
   extracting a fingerprint bit stream from the position in which the fingerprint is inserted.

19. The method of claim 18, wherein, in the determining of the position, a position in which a difference between a DWT coefficient of a corresponding pixel and an average of DWT coefficients of two neighboring pixels is less than a threshold is determined as the position in which the fingerprint is inserted.

20. The method of claim 18, wherein the fingerprint extraction determination value is acquired by $$m'_i = \left| y'_i - \frac{y'_{i-1} + y'_{i+1}}{2} \right|,$$

where $m_i'$ indicates the fingerprint extraction determination value, $y_i'$ indicates a DWT coefficient of the position in which the fingerprint is inserted, and i comprises a permutation indicating a position of the DWT coefficient.

21. The method of claim 20, wherein the fingerprint bit stream is extracted by $$x'_i = \left[ \frac{2y'_i - (y'_{i-1} + y'_{i+1})}{\alpha \cdot (y'_{i-1} + y'_{i+1})} \right],$$

where $x_i'$ indicates the fingerprint bit stream and α indicates an insertion strength control coefficient determined when inserting the fingerprint.

22. The method of claim 21, wherein the insertion strength control coefficient comprises a value between 0.02 and 0.1.

23. The method of claim 22, wherein the extracted fingerprint bit stream comprises any one of 1 and −1.

24. A non-transitory computer readable recording medium having stored thereon a computer program for executing a method of video fingerprint insertion, the method comprising:
   a first set of instructions configured to select a lowest frequency domain into which a fingerprint is to be inserted from frequency domains of a video transformed by a discrete wavelet transformation (DWT);
   a second set of instructions configured to determine a position in which the fingerprint is to be inserted based on a fingerprint insertion determination value in the selected lowest frequency domain, the fingerprint insertion determination value being an average value of a sequential block of a DWT coefficient in the lowest frequency domain; and
   a third set of instructions configured to insert a fingerprint bit stream whose insertion strength is controlled to the position in which the fingerprint is to be inserted.

25. A video fingerprint insertion apparatus, comprising:
   at least one processor, the at least one processor being configured to:
      select a lowest frequency domain into which a fingerprint is to be inserted from frequency domains of a video transformed by a discrete wavelet transformation (DWT); and
      determine a position in which the fingerprint is to be inserted based on a fingerprint insertion determination value in the selected lowest frequency domain, the fingerprint insertion determination value being an average value of a sequential block of a DWT coefficient in the lowest frequency domain; and
   a memory coupled to the at least one processor.

26. The apparatus of claim 25, wherein the at least one processor is configured to insert a fingerprint bit stream whose insertion strength is controlled to the position in which the fingerprint is to be inserted.

27. The apparatus of claim 25, wherein the at least one processor is configured to determine that a position in which a difference between the DWT coefficient of a corresponding pixel and an average of DWT coefficients of two neighboring pixels is less than a threshold in the position is the position in which the fingerprint is to be inserted.

28. A video fingerprint detection apparatus, comprising:
   at least one processor, the at least one processor being configured to:
      select a lowest frequency domain into which a fingerprint is inserted from frequency domains of a video transformed by a discrete wavelet transformation (DWT); and
      determine a position in which the fingerprint is inserted based on a fingerprint extraction determination value in the selected lowest frequency domain, the fingerprint extraction determination value being an average value of a sequential block of a DWT coefficient in the lowest frequency domain; and
   a memory coupled to the at least one processor.

29. The apparatus of claim 28, wherein the at least one processor is configured to extract a fingerprint bit stream from the position in which the fingerprint is inserted.

30. The apparatus of claim 29, wherein the at least one processor is configured to determine that a position in which a difference between the DWT coefficient of a corresponding pixel and an average of DWT coefficients of two neighboring pixels is less than a threshold in the position is the position in which the fingerprint is inserted.

* * * * *